July 24, 1951  J. SOOS  2,561,827
HOSE COUPLING
Filed Sept. 19, 1947
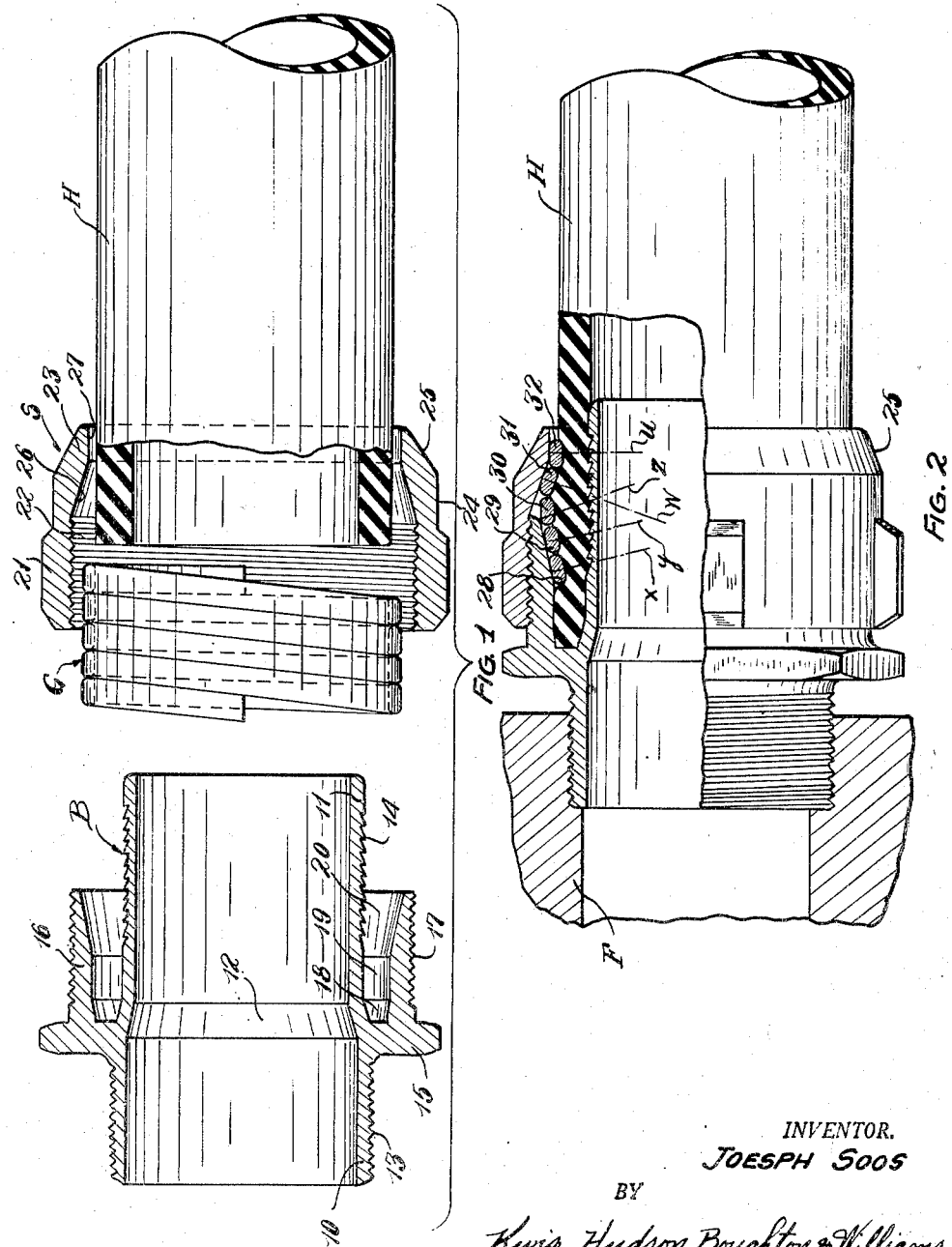
INVENTOR.
JOESPH SOOS
BY
Kwis, Hudson, Boughton & Williams
ATTORNEYS Patented July 24, 1951

2,561,827

UNITED STATES PATENT OFFICE 2,561,827

HOSE COUPLING

Joseph Soos, Cleveland, Ohio, assignor to The Gabriel Company, Cleveland, Ohio, a corporation of Ohio Application September 19, 1947, Serial No. 774,927

2 Claims. (Cl. 285—86)

This invention relates to a coupling and particularly to a hose coupling.

An object of the invention is to provide a hose coupling so designed as to have ease of assembly and to be readily attachable and detachable with respect to the hose.

A further object is to provide a hose coupling wherein a positive gripping action is obtained between the coupling and the hose and particularly wherein a portion of the connected hose is positively clamped and gripped between rigid surfaces of the coupling.

A further object is to provide a hose coupling which is simple in design and can be manufactured at relatively low cost.

Further and additional objects and advantages not hereinbefore referred to will become apparent hereinafter during the detailed description of an embodiment of the invention which is to follow.

The embodiment of the invention is illustrated in the accompanying drawing wherein, Fig. 1 is an exploded view of the coupling and the hose to be connected thereto, certain of the coupling parts being shown in section, other of the parts thereof being shown in elevation, while the hose is shown partly in section and partly in elevation, and Fig. 2 is a partial sectional and partial elevational view of the assembled coupling with the hose attached thereto.

The hose coupling embodying the present invention comprises three parts, namely, a body, a sleeve and a wire grip identified, respectively, in the drawing by the letters B, S and G. The body as shown includes an externally threaded tubular portion 10 adjacent one end of the body and a somewhat longer tubular portion 11 extending to the other end of the body and communicating with the tubular portion 10 by virtue of the conical bore 12. The tubular portion 10 is externally threaded as indicated at 13 to enable a suitable fitting to be screwed thereon, while the tubular portion 11 is provided on its periphery with a series of annular serrations 14 forming sharp edged teeth extending away from the outer end of the portion 11 and toward the portion 10 and acting to bite into the hose attached to the coupling as will later be explained. The tubular portion 10 might be a swivel nut or female internal thread or any other mechanical fastening.

The tubular portion 11 is of reduced diameter as compared with the portion 10, it being noted that the external diameter of the portion 11 is shown as approximately equal to the internal diameter of the portion 10. The body B is provided at the junction between the inner end of the portion 10 and the conical bore 12 with a radially extending flange 15, the periphery of which is of octagonal or other suitable configuration to provide wrench receiving surfaces to facilitate the assembly of the coupling. The flange 15 has integrally formed with it an axially extending cylindrical flange 16 and which is spaced radially outwardly of and surrounds the portion 11. The outer circumference of the cylindrical flange 16 is concentric to the portion 11 and is threaded as indicated at 17. The body is so formed that the space between the cylindrical flange 16 and the portion 11 comprises at its inner end a circular recess 18 having its width of diminishing taper toward the portion 10, a cylindrical recess 19 of constant width communicating with the recess 18, and a circular recess 20 communicating with the recess 19 and having its width of increasing taper toward the free end of the flange 16.

The sleeve S comprises a portion 21 internally threaded as indicated at 22 and provided on its circumference with suitable wrench receiving surfaces. The internal diameter of the portion 21 of the sleeve is such that when the sleeve is assembled with the body the threads 22 of the portion 21 will have screw threaded engagement with the threads 17 on the circular flange 16 of the body. The sleeve S also includes a portion 23 provided on its periphery with a cylindrical surface 24 adjacent the portion 21 and a conical surface 25 extending from the surface 24 to the end of the portion 23. The portion 23 internally has a conical bore 26 extending from and communicating with the threaded bore of the portion 21. The conical bore 26 merges with a cylindrical bore 27 located adjacent the right hand end of the sleeve as viewed in the drawings. The diameter of the cylindrical bore 27 is slightly greater than the external diameter of the hose H.

The wire grip G comprises a plurality of spirally wound convolutions of wire which is substantially oval in cross-section. The convolutions of the wire are closely wound and the internal diameter of the wire grip is such as to fit over the hose H with a snug fit. In the present illustration the wire grip is shown as including five convolutions, namely, 28, 29, 30, 31 and 32. It will be understood, however, that the number of the convolutions may vary for different size couplings and for other reasons.

The coupling is attached to the hose in the following manner: The sleeve S is first slid over the hose H with the portion 21 of the sleeve toward the free end of the hose and then the wire grip G is positioned on the hose and is located a short distance inwardly of the free end of the hose. Then the hose with the wire grip thereon is forced over the portion 11 of the body with the hose and wire grip located in the recesses 18, 19 and 20 between the portion 11 and the inner circumference of the circular flange 16, with the free end of the hose substantially at the inner end of the recess 18 and with the convolutions 28, 29 and 30 engaging the inner circumference of the recess 20. Then the sleeve S is moved forwardly on the hose into position to be screwed onto the flange 16 of the body. This is accomplished by holding either the body or sleeve stationary and rotating either the sleeve or body relative to the other to cause the threads 22 of the sleeve to screw upon the threads 17 of the body flange 16 and thus to effect relative axial movement between the body and sleeve. When the sleeve is completely screwed into position on the body the free end of the hose will be firmly pressed against the bottom of the recess 18 and said end of the hose will be tightly squeezed by the tapered walls of this recess. The convolutions 28 and 29 during the assembly of the coupling will have been forced along the conical bore 26 of the body and thus will have been pressed inwardly in the direction of resultant lines $x$ and $y$ to tightly grip the hose and to clamp the same between said two convolutions and the tubular portion 11.

In addition in the finally assembled position of the coupling the convolution 30 of the wire grip will be in contact with the conical surface 20 of the body adjacent the outer end of such surface and said convolution will be pressed toward the hose along resultant line $z$ but with less pressure than is exerted by the convolutions 28 and 29.

In the finally assembled position of the coupling the convolution 31 will be pressed into tight clamping engagement with the hose by the conical bore 26 of the sleeve with the pressure of the convolution 31 being exerted along resultant line $w$ which intersects line $z$. Also the convolution 32 of the wire grip will be pressed tightly against the hose by the cylindrical bore 27 of the sleeve with the pressure being exerted along line $u$.

From the foregoing explanation it will be seen that the hose is tightly clamped and attached to the coupling, first by the action of the tapered recess 18 of the body on the free end of the hose, and then by the action of the convolutions of the wire grip wherein the various convolutions exert their clamping pressures along resultant lines angularly disposed to each other and acting to firmly clamp the hose in position between the wire grip and the positive rigid tubular portion 11 of the body. In addition, the serrations 14 interengage with the inner circumference of the hose and function to further maintain the hose in attached position in the coupling. Also with the positively clamped hose extending in tight engagement with the portion 11 of the body and at its free end with the inner end of the recess 18 thereof and with the inner circumference of the recesses 18 and 19 of the body, a fluid-tight seal is accomplished. The body, as will be well understood, may have a suitable fitting F connected to it as by screwing the same onto the externally threaded portion 10 of the body.

When it is desired to detach the hose from the coupling the sleeve S is unscrewed from the body and slid away longitudinally of the hose. This causes the convolutions 31 and 32 of the wire grip to release their gripping pressures upon the hose and at the same time the pressures of the other convolutions of the wire grip against the hose are lessened. The hose and the body are then moved longitudinally relative to each other after disengaging the serrations 14 of the body from their interlocking relationship with the hose. This longitudinal relative movement between the body and the hose causes the convolutions 28, 29 and 30 of the wire grip to move out of or toward the large end of the conical recess 20 to release the pressure of said convolutions upon the hose and thus to facilitate the separation of the hose and body.

It will thus be seen that the detachment of the hose can be readily accomplished and also that its reattachment to the coupling can be performed quickly and effectively. In addition it will be seen that the coupling is composed of a relatively few number of parts of simple construction and of economical manufacture and that the hose is clamped positively in fluid-tight attached position between rigid surfaces.

Although a preferred embodiment of the invention has been illustrated and described herein it is understood that the invention is susceptible of various modifications and adaptations within the scope of the appended claims.

Having thus described my invention, I claim:

1. A hose coupling comprising a body having a tubular portion surrounded in radially spaced relationship by an axially extending externally threaded cylindrical flange providing with said portion a circular recess; said recess having at its inner end an inwardly tapered portion, a cylindrical portion intermediate its ends, and an outwardly tapered portion at its outer end; a sleeve adapted to be mounted on the hose and having an internally threaded portion and a portion provided with a conical interior and a cylindrical interior, said sleeve being adapted to be screwed upon said flange; and gripping means adapted to be mounted on the end of the hose and located within said recess and said sleeve and consisting of a plurality of convolutions of wound wire, with certain of the convolutions thereof located within the outwardly tapered portion of the recess, others thereof within the conical interior of the sleeve and another within the cylindrical interior of said sleeve whereby the convolutions are adapted to be forced tightly against the hose to grip the same against said tubular portion of the body and along angularly disposed resultant pressure lines.

2. A hose coupling comprising a body having a tubular portion surrounded in radially spaced relationship by an axially extending externally threaded and cylindrical flange providing with said tubular portion an axially extending recess; said flange adjacent its free end being internally provided with a conical surface portion and inwardly of said conical surface portion with a cylindrical surface portion, said tubular portion being adapted to extend within a hose and the latter adapted to be located within said recess, a sleeve adapted to be mounted on the hose and having an internally threaded portion cooperating with the externally threaded cylindrical flange and an internal conical portion and an internal cylindrical portion, the internal conical portions of said flange and said sleeve being located in juxtaposition and oppositely disposed, an elongated gripping means adapted to be wound on the end of the hose and located within said recess and said sleeve and consisting of three or more convolutions, with certain of the convolutions located within and engaged by the interior conical surface portion of said flange, with other of the convolutions located within and engaged by the interior conical surface portion of said sleeve and with still another of said convolutions located within and engaged by the interior cylindrical surface portion of said sleeve whereby the convolutions are adapted to be forced tightly against the hose to grip the same against said tubular portion of the body and along angularly disposed resultant pressure lines.

JOSEPH SOOS.

REFERENCES CITED

The following references are of record in the file of this patent:

UNITED STATES PATENTS

| Number | Name | Date |
| --- | --- | --- |
| 411,829 | Nachtrieb | Oct. 1, 1889 |